UNITED STATES PATENT OFFICE.

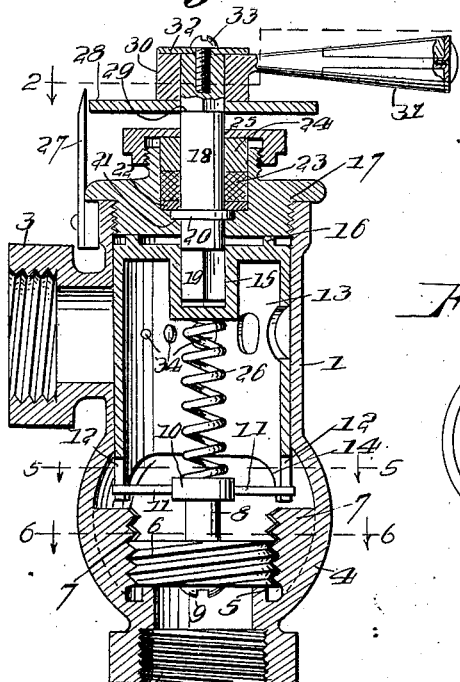

CHARLES E. SCHREIDT, OF MANSFIELD, OHIO.

VALVE.

1,088,103.

Specification of Letters Patent.

Patented Feb. 24, 1914.

Application filed May 18, 1912. Serial No. 698,148.

*To all whom it may concern:*

Be it known that I, CHARLES E. SCHREIDT, a citizen of the United States of America, residing at Mansfield, in the county of Richland and State of Ohio, have invented certain new and useful Improvements in Valves, of which the following is a specification.

This invention relates to certain new and useful improvements in valves, and has for its object the provision of means which will positively control the flow of steam or other fluid from the inlet to the outlet in such manner that the flow will be gradual, *i. e.*, when the valve is operated the fluid will be allowed to enter and leave the valve gradually.

In the drawings: Figure 1, is a vertical sectional view of the invention; Fig. 2 is a section on the line 2—2 of Fig. 1; Fig. 3 is a top plan view of the shell; Fig. 4 is a side elevation of the shell; Fig. 5 is a section on the line 5—5 of Fig. 1; Fig. 6 is a similar view on the line 6—6 of Fig. 1; and Fig. 7 is a fragmentary sectional view of a modification.

The valve casing 1 is formed with an inlet 2 and an outlet 3. The lower end of the casing above the inlet 2 is globular in shape as indicated at 4 and is formed with an integral circular seat 5 for the disk valve 6, and with a plurality of wings 7 that are threaded to engage with the threaded periphery of the disk valve 6. A stud 8 is carried by the upper face of the disk valve 6 and the latter has a slotted head 9 which permits turning of the disk valve with a screw driver. Stud 8 is formed with a flanged head 10 that carries a rod 11 the ends of which project into elongated vertical slots 12 formed in the contracted portions 14 carried by the lower end of the valve shell 13. The valve shell 13 has its upper end closed and formed with a socket 15 which is square in cross-section, and bears an annular rib 16 that surrounds the socket, the rib bearing against the under face of the cap 17 which is threaded into engagement with the upper end of the casing 1. A stem 18 having a squared lower end portion 19, which latter extends into socket 15, projects through the cap 17, and further has a collar 20 which engages and rests on a shoulder 21 formed in the cap. Above the shoulder 21 the cap is chambered to receive a washer 22 that surrounds stem 18 and engages collar 20, packing 23 being arranged in the chamber to overlie washer 22, the packing in turn being engaged by a gland 24 which is held in place by a cap 25 threaded onto the upper end of the cap 17.

A coil spring 26 seats at its lower end on the head 10 of stud 8, and at its upper end bears against the lower or bottom wall of the socket 15, the spring serving to press the rib 16 of shell 13 against cap 17. Secured to the casing at one side thereof, is a stationary index finger 27 which extends in proximity to a graduated dial 28 which is mounted on the stem 18 to abut a shoulder 29 formed thereon, the stem above the shoulder being squared and receiving over its squared portion a boss 30 which has handle 31 integral therewith, the boss being secured in position by means of a washer 32 and a screw 33 which has its head engaging the washer and its threaded shank extending into the squared portion of stem 18.

The valve shell 13 is formed with a series of openings 34 which successively increase in diameter, and which are so arranged that when the shell is moved by handle 31 to open position, the opening or openings of least diameter will first be brought to register with the outlet 3, and at the same time, the rotation of the shell will effect partial raising of the disk valve 6, due to the rod 11 of stud 8, which rod is caused to rotate with the shell. Upon further rotation of the shell, the next adjacent opening or openings 34 will be alined with the outlet 3, and the valve disk 6 will be correspondingly farther raised, allowing a greater quantity of the fluid to enter through inlet 2, and egress through outlet 3, the bringing into register of the successive openings 34 with outlet 3 resulting in corresponding raising of the disk valve 6 that controls the inlet.

From the above it will be seen that there are two valves, one controlling the inlet and one the outlet, the two valves being operated in unison, so that as the inlet valve permits a greater amount of fluid to enter the casing, the outlet valve will be correspondingly opened to permit the fluid to egress, the closing of the valve being likewise gradual, as will be evident.

In the modification shown in Fig. 7, the valve shell 13' is interiorly threaded at 31 and engages with the threaded periphery of the disk valve 6', the latter having a depending stem 32 that engages with an annular seat 33 formed at the inlet end 2' of casing 1', the casing being formed with grooved wings 7' in which engage the ends of the rod 11' carried by the stem 32, the said rod ends being vertically slidable in the grooves.

The dial 28 is marked and related to the index finger 27 so that the various positions of the shell 13 will be indicated upon the dial.

What is claimed is:

1. In a valve, means to control the inlet, means to control the outlet, and means whereby rotation of the outlet controlling means will cause corresponding movement of the inlet controlling means including a rod carried by the inlet controlling means, and slotted parts in the outlet controlling means to engage the ends of the rod.

2. In a valve, a casing, a shell having a socket in its top, a stem extending into the socket to enable rotation of the shell, a cap on the casing in engagement with the top end of the shell, said shell having a fluid opening therein adapted when rotated to be brought into registry with the outlet of the casing, a valve threaded into the casing below the shell for controlling the inlet to the casing, a stud carried by the valve, a spring seating on the stud and engaging the bottom wall of the shell socket, said shell having its lower end slotted, and a rod carried by the stud and having its ends extending into said slots of the shell.

3. In a valve, an upper rotary shell having a series of graduated openings for successive register with the outlet, a valve to control the inlet, means in connection with the valve to hold the shell in upper position, and means whereby rotation of the shell will cause movement of the valve to correspondingly increase or decrease the size of the inlet opening.

4. In a valve, a shell having an opening for controlling the outlet, a valve controlling the inlet, a stud on said valve, means to rotate the valve by movement of the shell, and a spring engaging the stud of the valve and shell to hold the latter up.

5. The combination in a valve comprising a valve to control the inlet, rotatable means to control the outlet, said means being in superposed relation to the valve, a loose connection between said means and the valve whereby movement of the rotatable outlet means will cause corresponding movement of the valve and means to support the first named means from the valve.

6. In a valve having means to control its inlet, a valve operating stem, means to control the outlet formed with fluid egressing passages that are of successively increasing size, means to connect the two mentioned means whereby they may be operated in unison, a dial connected to said operating stem to move with the latter, and a stationary finger secured to the valve body and having its upper end disposed adjacent to the dial periphery and extending above the upper face of said dial.

In testimony whereof I affix my signature in presence of two witnesses.

CHARLES E. SCHREIDT.

Witnesses:
  DOROTHY WENDLAND,
  ELIZABETH KUPP.